United States Patent
Han

(10) Patent No.: US 11,727,398 B2
(45) Date of Patent: *Aug. 15, 2023

(54) METHOD FOR PROVING DIGITAL ASSETS OF TRANSACTION PLATFORM

(71) Applicant: GATE INFORMATION PTE. LTD., Singapore (SG)

(72) Inventor: Lin Han, London (CA)

(73) Assignee: GATE INFORMATION PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,833

(22) Filed: Sep. 12, 2022

(65) Prior Publication Data

US 2023/0004963 A1 Jan. 5, 2023

Related U.S. Application Data

(63) Continuation of application No. 17/143,842, filed on Jan. 7, 2021, now Pat. No. 11,443,309.

(30) Foreign Application Priority Data

Jan. 8, 2020 (CN) .......................... 202010017576.4

(51) Int. Cl.
*G06Q 20/38* (2012.01)
*G06Q 40/04* (2012.01)
*H04L 9/32* (2006.01)

(52) U.S. Cl.
CPC ......... *G06Q 20/3827* (2013.01); *G06Q 40/04* (2013.01); *H04L 9/3239* (2013.01)

(58) Field of Classification Search
None
See application file for complete search history.

(56) References Cited

U.S. PATENT DOCUMENTS

2010/0153224 A1* 6/2010 Livnat .................... G06Q 40/12
709/219
2020/0092107 A1* 3/2020 Cole ................... G06F 21/6245
(Continued)

OTHER PUBLICATIONS

"Richard C. Kloch, Blockchain and Internal Audit, Oct. 15, 2019," (Year: 2019).*

(Continued)

*Primary Examiner* — Kito R Robinson
*Assistant Examiner* — Toan Duc Bui
(74) *Attorney, Agent, or Firm* — Baker & McKenzie LLP

(57) ABSTRACT

Example embodiments relate to methods of proving digital assets. The method includes identifying users on an asset transaction platform. The method includes generating a snapshot for each identified user at a first time. Each snapshot includes a user identity and user assets amount for the user at the first time. The user assets amount is a total amount of digital assets held by the user on the asset transaction platform at the first time. The method includes transforming each snapshot into a string combined hash value. Each string combined hash value is generated by hashing one of the snapshots of the user identity and the user assets amount for the first time. The method includes generating a merkle tree. The merkle tree includes a leaf node for each of the string combined hash values. The method includes performing an audit process of the asset transaction platform for the first time.

24 Claims, 2 Drawing Sheets

(56) References Cited

U.S. PATENT DOCUMENTS

2020/0127833 A1\* 4/2020 Konda ................. H04L 9/3213
2021/0209590 A1 7/2021 Han

OTHER PUBLICATIONS

"Jeroen van Oerle, Patrick Lemmens, Distributed ledger technology for the financial industry, May 12-17, 2016," (Year: 2016).\*
"In depth: A look at current financial reporting issues, Dec. 2019, PWC, 15-17" (Year: 2019).

\* cited by examiner

METHOD FOR PROVING DIGITAL ASSETS OF TRANSACTION PLATFORM

CROSS REFERENCE TO RELATED APPLICATION

This application is a continuation application of and claims priority to U.S. patent application Ser. No. 17/143,842 filed on Jan. 7, 2021, which claims priority to CN Patent Application No. 202010017576.4 filed on Jan. 8, 2020, the disclosures of all of which are hereby incorporated by reference in their entirety. The requirement for a certified copy of the foreign priority application is satisfied for this application as the prior-filed nonprovisional application, U.S. patent application Ser. No. 17/143,842, contains a certified copy of the foreign priority application, CN Patent Application No. 202010017576.4, which was electronically retrieved in the prior-filed nonprovisional application by the USPTO on Sep. 13, 2022.

TECHNICAL FIELD

The present invention relates to the technical field of digital transaction, in particular to a method for proving digital assets of a transaction platform.

BACKGROUND

For various financing services related to digital assets, a service provider usually stores digital assets of a user with no authority. The assets of each user are recorded in a ledger in a centralized database. The total amount of assets owned by a user recorded in a centralized ledger is called the total amount of assets belonging to the user. Assets of users held by the service provider are called valid user provisions. For example, on a blockchain-based digital assets service platform, the total amount of assets displayed in each of all user accounts is the total amount of assets belonging to users, and the total amount of blockchain-based assets that the platform service provider stores and has the right to control in a blockchain network is the valid user provisions. Since the user provisions can be disposed with no authority by the service provider and are beyond the supervision of common users, it is possible that the service provider uses the user provisions without the permission of users, causing the situation in which the valid user provisions are less than the total amount of assets belonging to users. This results in users's distrust of the digital assets service provider. The service provider can eliminate doubts from users and gain users' trust by proving that the valid user provisions held by itself are not less than the total amount of assets belonging to users on the platform in an effective way.

SUMMARY OF THE INVENTION

To overcome the defects in the prior art, the present invention provides a method for providing digital assets. By combining a mathematic algorithm and a computer, the present application provides a user with an entrusted method for verifying the valid user provisions and the total amount of assets of the user on the platform, while protecting the assets privacy of each of the users, to resolve the problems in prior art.

In an exemplary embodiment, a method for proving digital assets of an asset transaction platform is described. The method includes identifying, by a server, all users on an asset transaction platform. The method also includes generating, by the server, a snapshot for each of the identified users at a first time instant. Each snapshot includes a user identity and a user assets amount for the user at the first time instant. The user assets amount for each user at the first time instant is a total amount of digital assets held by the user on the asset transaction platform at the first time instant. The method also includes transforming, by the server, each of the snapshots of the user identity and the user assets amount for the first time instant into a string combined hash value. Each string combined hash value is generated by hashing one of the snapshots of the user identity and the user assets amount for the first time instant. The method also includes generating, by the server, a merkle tree for the plurality of string combined hash values. The merkle tree includes a leaf node for each of the plurality of string combined hash values. The method also includes performing an audit process of the asset transaction platform for the first time instant. The audit process includes generating, for the first time instant, a valid user provision for the asset transaction platform. The valid user provision for the asset transaction platform for the first time instant is the total amount of digital assets held by the asset transaction platform at the first time instant. The audit process also includes verifying the user identity and user assets amount of each user on the asset transaction platform for the first time instant. The verifying includes generating a first hash for each user on the asset transaction platform for the first time instant. Each of the first hashes is a hash of the user identity and user assets amount for the user for the first time instant. The verifying also includes comparing each of the first hashes with the string combined hash values stored in the leaf nodes in the merkle tree.

In another exemplary embodiment, a method for proving digital assets of an asset transaction platform is described. The method includes identifying, by a server, one or more users on an asset transaction platform. The method also includes generating, by the server, a snapshot for each of the identified users at a first time instant. Each snapshot includes a user identity and a user assets amount for the user at the first time instant. The user assets amount for each user at the first time instant is an amount of a first set of digital assets held by the user on the asset transaction platform at the first time instant. The first set of digital assets includes at least a first digital asset. The method also includes transforming, by the server, each of the snapshots of the user identity and the user assets amount for the first time instant into a string combined hash value. Each string combined hash value is generated by hashing one of the snapshots of the user identity and the user assets amount for the first time instant. The method also includes generating, by the server, a merkle tree for the plurality of string combined hash values. The merkle tree includes a leaf node for each of the plurality of string combined hash values. The method also includes performing an audit process of the asset transaction platform for the first time instant. The audit process includes generating, for the first time instant, a valid user provision for the identified users for the asset transaction platform. The valid user provision for the asset transaction platform for the identified users for the first time instant is the amount of the first set of digital assets of the identified users held by the asset transaction platform at the first time instant. The audit process also includes verifying the user identity and user assets amount of each of the identified users on the asset transaction platform for the first time instant. The verifying includes generating a first hash for each of the identified users on the asset transaction platform for the first time instant. Each of the first hashes is a hash of the user identity and user assets amount for the identified user for the first time instant. The verifying also includes comparing each of the first hashes with the string combined hash values stored in the leaf nodes in the merkle tree.

In another exemplary embodiment, a method for proving digital assets of an asset transaction platform is described. The method includes generating, by a server, a snapshot for one or more users at a first time instant. Each snapshot includes a user identity and a user assets amount for the user at the first time instant. The user assets amount for each user at the first time instant being an amount of a first set of digital assets held by the user on the asset transaction platform at the first time instant. The first set of digital assets includes at least one type of digital asset. The method also includes transforming, by the server, each of the snapshots of the user identity and the user assets amount for the first time instant into a string combined hash value. Each string combined hash value is generated by hashing one of the snapshots of the user identity and the user assets amount for the first time instant. The method also includes generating, by the server, a merkle tree for the plurality of string combined hash values. The merkle tree includes a leaf node for each of the plurality of string combined hash values. The method also includes performing an audit process of the asset transaction platform for the first time instant. The audit process includes verifying the user identity and user assets amount of each of the one or more users on the asset transaction platform for the first time instant. The verifying includes generating a first hash for each of the one or more users on the asset transaction platform for the first time instant. Each of the first hashes is a hash of the user identity and user assets amount for the user for the first time instant. The verifying also includes comparing each of the first hashes with the string combined hash values stored in the leaf nodes in the merkle tree.

The present invention is also achieved through the following technical solution: A method for providing digital assets of a transaction platform is provided, wherein an asset transaction platform and a server are used. The method includes the following steps:

step 1: taking snapshot of a user identity and a user assets amount of each of all users, recorded by the asset transaction platform, by the server within a snapshot time;

step 2: exporting the snapshots of the user identity and the user assets amount into a user asset list;

step 3: setting mathematical hash functions, wherein each of the users corresponds to a mathematic hash function, and the mathematic hash function is used to calculate a string combined hash value of the user identity and the user assets amount or disclose the total amount of assets of each of the users and the valid user provisions of the transaction platform;

step 4: generating a merkle tree by using the string combined hash value of each of the users as a leaf node, and storing the merkle tree; and, step 5: verifying the valid user provisions and the total amount of assets of all users on the transaction platform, and drawing a conclusion.

Further preferably, the user assets amount is the sum of similar assets in various accounts of a user on a service provider platform.

Further preferably, the leaf node formed by the string combined hash value of each of the users can be open to the public.

Further preferably, the snapshot time is any time provided by the server.

Further preferably, a third-party auditing body compares each piece of information in the user asset list with the leaf node open to the public to ensure consistency.

Further preferably, the method further includes step 6: supplying the account number of the valid user provisions held by a service provider to the third-party auditing body, comparing the valid user provisions held by the service provider with the sum of the total amount of assets owned each of all users, and drawing a conclusion by the third-body auditing body.

Further preferably, the user verifies own string combined hash value.

Beneficial Effects of the Invention:

According to the present application, the user assets amount and the user information are exported into the user asset list; the string combined hash value of the user is used as the leaf node of the merkle tree; and the account assets hash value of each of the users is stored in the leaf node of the merkle tree through the merkle tree. A third-party financial auditing body audits the total amount of the assets of each of the users stored in the leaf node of the merkle tree, and reviews and verifies the valid user provisions held by the service provider. Finally, the third-party financial auditing body provides a written audit report and discloses the audit result to the public. At the same time, the merkle tree storing the assets hash values of all users is open to the public. Each of the users of the service provider can verify whether the amount of assets in its own account is accurately included in the merkle tree through mathematic algorithms. When it is not necessary to consider the assets amount-related privacy of each of the users, the audit link executed by the third-party financial auditing body can be omitted by a method of disclosing the assets amount of each of the users and the voucher of the valid provisions, and then users can perform audit and check by themselves. The present application is suitable for wide application.

DETAILED DESCRIPTION OF THE INVENTION

To clarify the technical characteristics of the present solution, the present application has been illustrated in detail through the following description with reference to the specific embodiments and attached drawings.

Example 1

Figure 1:
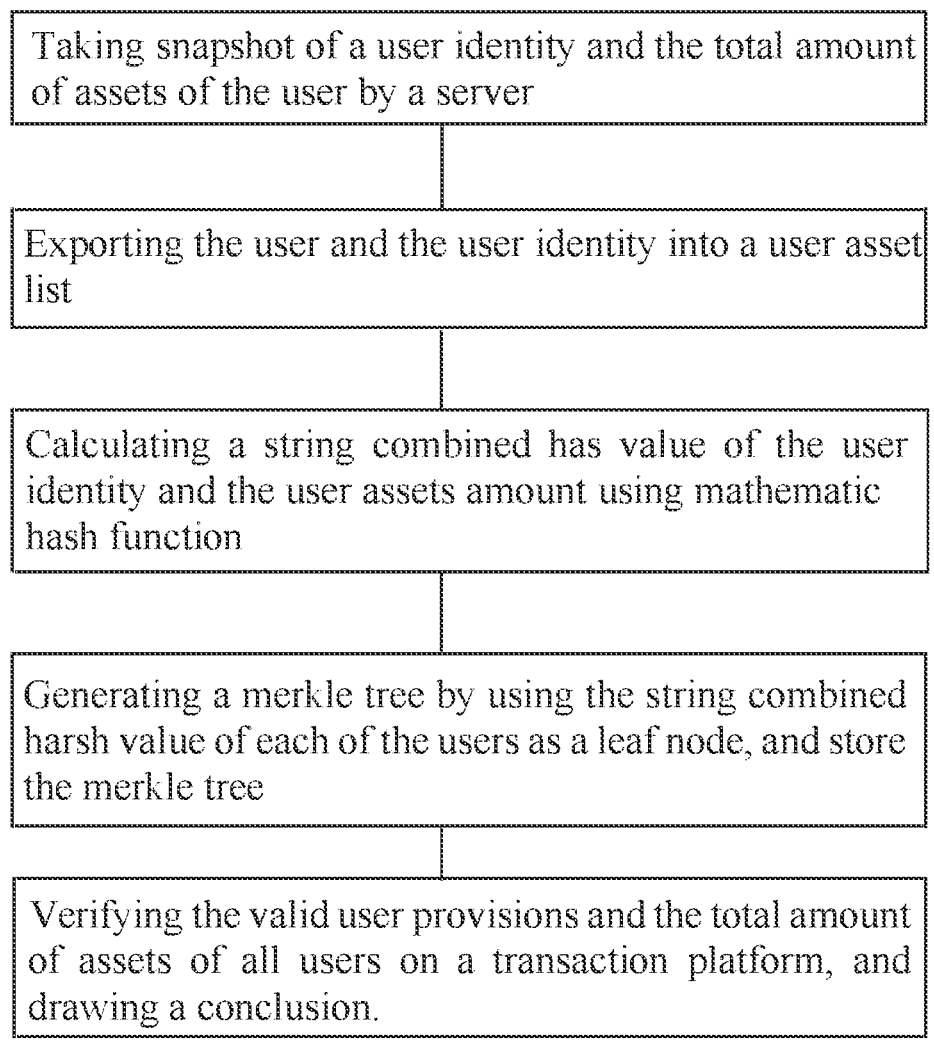
FIG. 1 is a flowchart of the present application.
Figure 2:
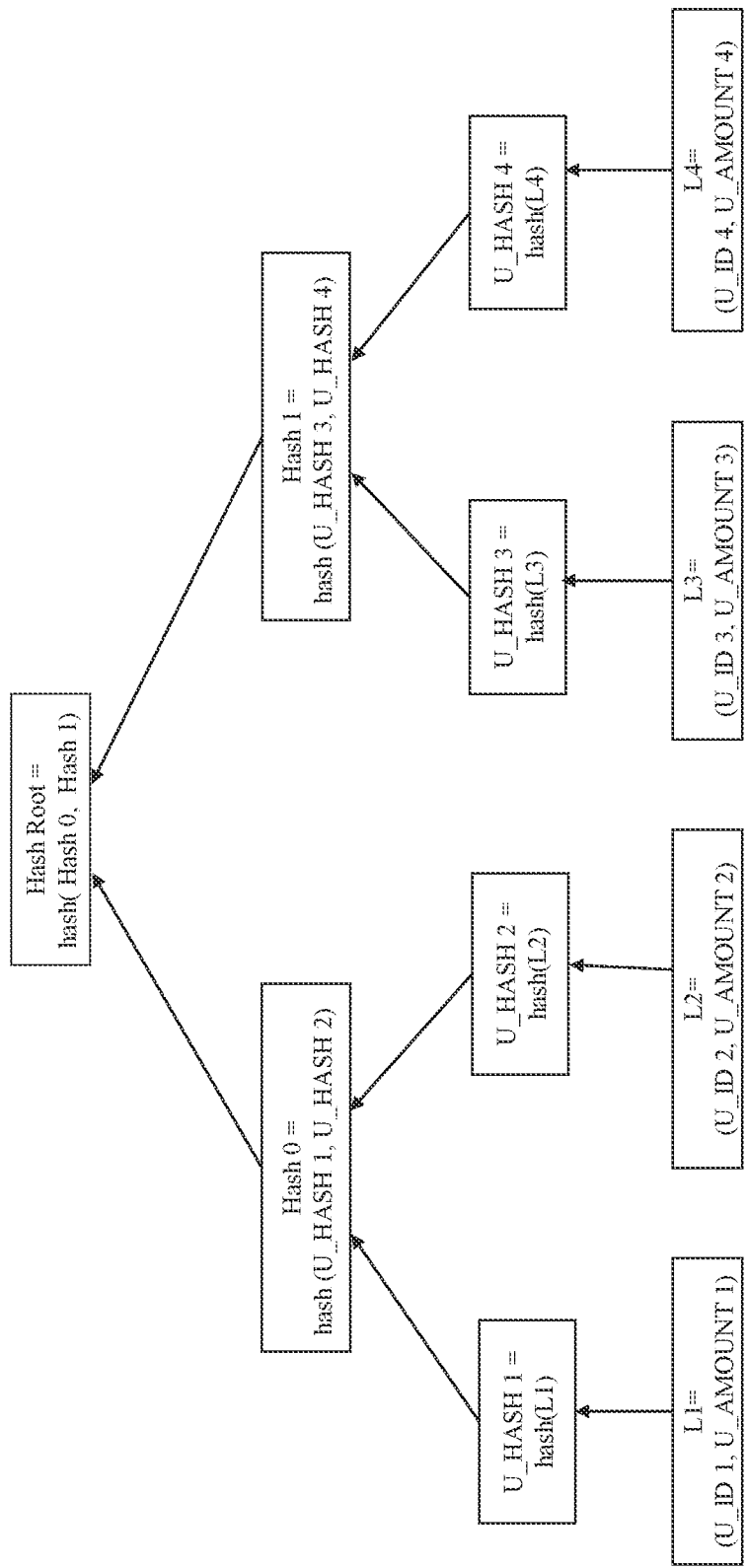
FIG. 2 is a flowchart of generating a merkle tree of four users according to Example 1.

As shown in FIG. 1-FIG. 2, the present example discloses two methods, i.e., which are used to provide a voucher of the total amount of assets of users held by a service provider and a voucher of valid user provisions, respectively. The account assets hash value of each of users is stored in a leaf node of a merkle tree through the merkle tree. The third-party financial auditing body audits the total amount of the assets of each of the users stored in the leaf node of the merkle tree, and reviews and verifies the valid user provisions held by the service provider. Finally, the third-party financial auditing body provides a written audit report and discloses the audit result to the public. At the same time, the merkle tree storing the assets hash values of all users is open to the public. Each of the users of the service provider can verify whether the amount of assets in its own account is accurately included in the merkle tree through mathematic algorithms. When it is not necessary to consider the assets amount privacy of each of the users, the audit link executed by the third-party financial auditing body can be omitted by a method of disclosing the assets amount of each of the users and the voucher of the valid provisions, and then users can perform audit and check by themselves.

A method for proving digital assets of a transaction platform is provided, wherein an asset transaction platform and a server are involved; the method includes the following steps:

step 1: taking snapshot of a user identity and a user assets amount of each of all users, recorded by the asset transaction platform, by the server within snapshot time;

step 2: exporting the snapshots of the user identity and the user assets amount into a user asset list;

step 3: setting mathematical hash functions, wherein each of the users corresponds to a mathematic hash function, and the mathematic hash function is used to calculate a string combined hash value of the user identity and the user assets amount;

step 4: generating a merkle tree by using the string combined hash value of each of the users as a leaf node, and storing the merkle tree; and, step 5: providing the generated user asset list to a third-party auditing body, and performing verification and drawing a conclusion by the third-party auditing body.

Take four users an example. The string combined hash values of the users are formed into a leaf node and open to the public. The account numbers of the valid user provisions held by a service provider are provided to the third-party auditing body, and the third-party auditing body compares the valid user provisions held by the service provider with the sum of the total amount of assets owned by each of all users and draws a conclusion.

Example 2

Different from Example 1, the server publishes the total amount of assets of all users and the valid user provisions of the transaction platform, such that anyone can verify whether the provisions of the transaction platform are greater than the sum of assets of all users by himself/herself.

According to the method of the present application, two ways are adopted to provide a voucher of the total amount of assets of users held by a service provider and a voucher of valid user provisions. The account assets hash value of each of users is stored in a leaf node of a merkle tree through the merkle tree. The third-party financial auditing body audits the total amount of the assets of each of the users stored in the leaf node of the merkle tree, and reviews and verifies the valid user provisions held by the service provider. Finally, the third-party financial auditing body provides a written audit report and discloses the audit result to the public. At the same time, the merkle tree storing the assets hash values of all users is open to the public. Each of the users of the service provider can verify whether the amount of assets in its own account is accurately included in the merkle tree through mathematic algorithms. When it is not necessary to consider the assets amount privacy of each of the users, the audit link executed by the third-party financial auditing body can be omitted by a method of disclosing the assets amount of each of the users and the voucher of the valid provisions, so that anyone can perform verification by himself/herself. The present application helps users perform audit and check by themselves.

Matters which are not described in detail in the present application all belong to technologies well known to those skilled in the art. Finally, it should be noted that, the above embodiments are merely used to illustrate the technical solution of the present application, and are not intended to limit the present application. Even if preferred embodiments are used to describe the present application in further detail, an ordinarily skilled in the art shall understand that, the technical solution of the present application can still be modified or equivalently substituted. All modifications or equivalent institutions made within the spirit of the technical solution of the present application shall fall within the protective scope of the claims of the present application.

What is claimed is:

1. A method for proving digital assets of an asset transaction platform, the method comprising:
   identifying, by a server, all users on an asset transaction platform;
   generating, by the server, a snapshot for each of the identified users at a first time instant, each snapshot including a user identity and a user assets amount for the user at the first time instant, the user assets amount for each user at the first time instant being a total amount of digital assets held by the user on the asset transaction platform at the first time instant;
   transforming, by the server, each of the snapshots of the user identity and the user assets amount for the first time instant into a string combined hash value, wherein each string combined hash value is generated by hashing one of the snapshots of the user identity and the user assets amount for the first time instant;
   generating, by the server, a merkle tree for the plurality of string combined hash values, the merkle tree including a leaf node for each of the plurality of string combined hash values; and
   performing an audit process of the asset transaction platform for the first time instant, the audit process including:
      generating, for the first time instant, a valid user provision for the asset transaction platform, the valid user provision for the asset transaction platform for the first time instant being the total amount of digital assets held by the asset transaction platform at the first time instant;
      verifying the user identity and user assets amount of each user on the asset transaction platform for the first time instant, the verifying including:
         generating a first hash for each user on the asset transaction platform for the first time instant, each of the first hashes being a hash of the user identity and user assets amount for the user for the first time instant;
         comparing each of the first hashes with the string combined hash values stored in the leaf nodes in the merkle tree;
         responsive to a determination that all of the first hashes match with the string combined hash values stored in the leaf nodes in the merkle tree:
            generating a first summation for the first time instant, the first summation for the first time instant being a summation of the user assets amount for all of the users for the first time instant.

2. The method of claim 1, further comprising:
   responsive to a determination that all of the first hashes match with the string combined hash values stored in the leaf nodes in the merkle tree:

comparing the first summation for the first time instant with the valid user provision for the asset transaction platform for the first time instant.

3. The method of claim 1, further comprising:
responsive to a determination that the first summation for the first time instant is less than or equal to the valid user provision of the asset transaction platform for the first time instant:
returning a result confirming the valid user provision of the asset transaction platform.

4. The method of claim 1, further comprising:
responsive to a determination that the first summation for the first time instant is equal to the valid user provision of the asset transaction platform for the first time instant:
returning a result confirming the valid user provision of the asset transaction platform.

5. The method for proving digital assets of a transaction platform according to claim 1,
wherein the user assets amount is the sum of similar assets in various accounts of a user on a service provider platform.

6. The method for proving digital assets of a transaction platform according to claim 1,
wherein the leaf node formed by the string combined hash value of each of the users is capable of being open to the public.

7. The method for proving digital assets of a transaction platform according to claim 1,
wherein the first time instant is any time instant provided by the server.

8. The method for proving digital assets of a transaction platform according to claim 1,
wherein the audit process is performed by a third-party auditing body.

9. The method for proving digital assets of a transaction platform according to claim 1,
wherein the user verifies own string combined hash value.

10. A method for proving digital assets of an asset transaction platform, the method comprising:
identifying, by a server, one or more users on an asset transaction platform;
generating, by the server, a snapshot for each of the identified users at a first time instant, each snapshot including a user identity and a user assets amount for the user at the first time instant, the user assets amount for each user at the first time instant being an amount of a first set of digital assets held by the user on the asset transaction platform at the first time instant, wherein the first set of digital assets includes at least a first digital asset;
transforming, by the server, each of the snapshots of the user identity and the user assets amount for the first time instant into a string combined hash value, wherein each string combined hash value is generated by hashing one of the snapshots of the user identity and the user assets amount for the first time instant;
generating, by the server, a merkle tree for the plurality of string combined hash values, the merkle tree including a leaf node for each of the plurality of string combined hash values; and
performing an audit process of the asset transaction platform for the first time instant, the audit process including:
generating, for the first time instant, a valid user provision for the identified users for the asset transaction platform, the valid user provision for the asset transaction platform for the identified users for the first time instant being the amount of the first set of digital assets of the identified users held by the asset transaction platform at the first time instant;
verifying the user identity and user assets amount of each of the identified users on the asset transaction platform for the first time instant, the verifying including:
generating a first hash for each of the identified users on the asset transaction platform for the first time instant, each of the first hashes being a hash of the user identity and user assets amount for the identified user for the first time instant;
comparing each of the first hashes with the string combined hash values stored in the leaf nodes in the merkle tree; and
responsive to a determination that all of the first hashes match with the string combined hash values stored in the leaf nodes in the merkle tree:
generating a first summation for the first time instant, the first summation for the first time instant being a summation of the user assets amount for each of the identified users for the first time instant.

11. The method of claim 10, further comprising:
responsive to a determination that all of the first hashes match with the string combined hash values stored in the leaf nodes in the merkle tree:
comparing the first summation for the first time instant with the valid user provision for the identified users for the asset transaction platform for the first time instant.

12. The method of claim 10, further comprising:
responsive to a determination that the first summation for the first time instant is less than or equal to the valid user provision for the identified users for the asset transaction platform for the first time instant:
returning a result confirming the valid user provision of the asset transaction platform.

13. The method of claim 10, further comprising:
responsive to a determination that the first summation for the first time instant is equal to the valid user provision for the identified users for the asset transaction platform for the first time instant:
returning a result confirming the valid user provision of the asset transaction platform.

14. The method for proving digital assets of a transaction platform according to claim 10,
wherein the user assets amount is the sum of the digital assets in the first set of digital assets in various accounts of the identified user on the service provider platform.

15. The method for proving digital assets of a transaction platform according to claim 10,
wherein the leaf node formed by the string combined hash value of each of the identified users is capable of being open to the public.

16. The method for proving digital assets of a transaction platform according to claim 10,
wherein the first time instant is any time instant provided by the server.

17. The method for proving digital assets of a transaction platform according to claim 10,
wherein the audit process is performed by a third-party auditing body.

18. The method for proving digital assets of a transaction platform according to claim 10,
wherein the identified user verifies own string combined hash value.

19. A method for proving digital assets of an asset transaction platform, the method comprising:
- generating, by a server, a snapshot for one or more users at a first time instant, each snapshot including a user identity and a user assets amount for the user at the first time instant, the user assets amount for each user at the first time instant being an amount of a first set of digital assets held by the user on the asset transaction platform at the first time instant, wherein the first set of digital assets includes at least one type of digital asset;
- transforming, by the server, each of the snapshots of the user identity and the user assets amount for the first time instant into a string combined hash value, wherein each string combined hash value is generated by hashing one of the snapshots of the user identity and the user assets amount for the first time instant;
- generating, by the server, a merkle tree for the plurality of string combined hash values, the merkle tree including a leaf node for each of the plurality of string combined hash values; and
- performing an audit process of the asset transaction platform for the first time instant, the audit process including:
  - verifying the user identity and user assets amount of each of the one or more users on the asset transaction platform for the first time instant, the verifying including:
    - generating a first hash for each of the one or more users on the asset transaction platform for the first time instant, each of the first hashes being a hash of the user identity and user assets amount for the user for the first time instant;
    - comparing each of the first hashes with the string combined hash values stored in the leaf nodes in the merkle tree;
    - responsive to a determination that all of the first hashes match with the string combined hash values stored in the leaf nodes in the merkle tree:
      - generating a first summation for the first time instant, the first summation for the first time instant being a summation of the user assets amount for each of the identified users for the first time instant.

20. The method of claim 19, further comprising:
- responsive to a determination that all of the first hashes match with the string combined hash values stored in the leaf nodes in the merkle tree:
- comparing the first summation for the first time instant with the valid user provision for the identified users for the asset transaction platform for the first time instant.

21. The method of claim 19, wherein the audit process further comprises:
- generating, for the first time instant, a valid user provision for the one or more users for the asset transaction platform, the valid user provision for the asset transaction platform for the one or more users for the first time instant being the amount of the first set of digital assets of the one or more users held by the asset transaction platform at the first time instant.

22. The method of claim 21, further comprising:
- responsive to a determination that the first summation for the first time instant is less than or equal to the valid user provision for the identified users for the asset transaction platform for the first time instant:
  - returning a result confirming the valid user provision of the asset transaction platform.

23. The method of claim 21, further comprising:
- responsive to a determination that the first summation for the first time instant is equal to the valid user provision for the identified users for the asset transaction platform for the first time instant:
  - returning a result confirming the valid user provision of the asset transaction platform.

24. The method for proving digital assets of a transaction platform according to claim 19,
- wherein the user assets amount is the sum of the digital assets in the first set of digital assets in various accounts of the one or more users on the service provider platform.

* * * * *